June 11, 1968  C. D. ADAMS  3,387,414
EXTENDIBLE BOOM
Filed Oct. 23, 1965  2 Sheets-Sheet 1
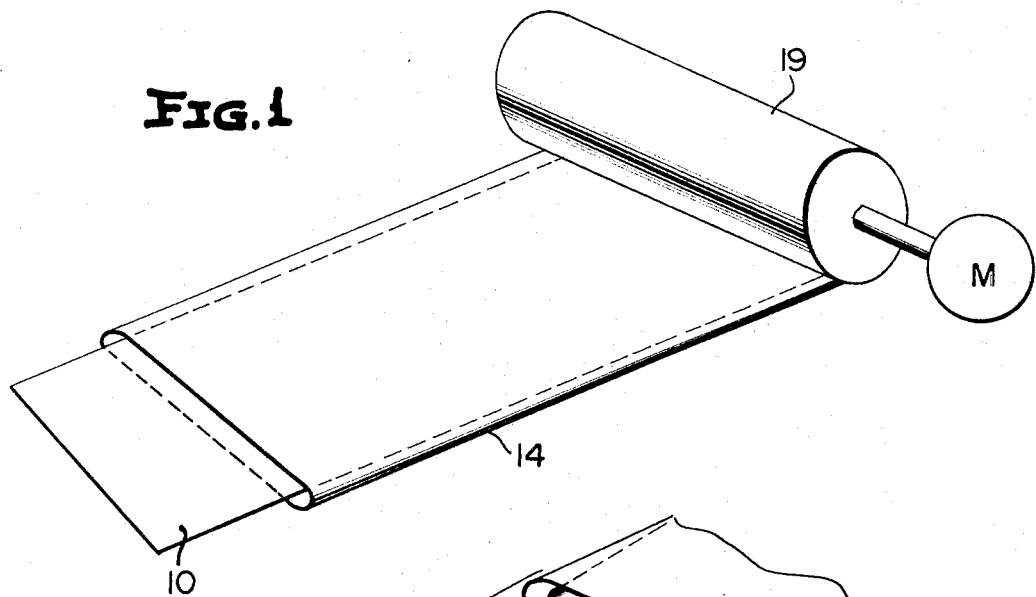
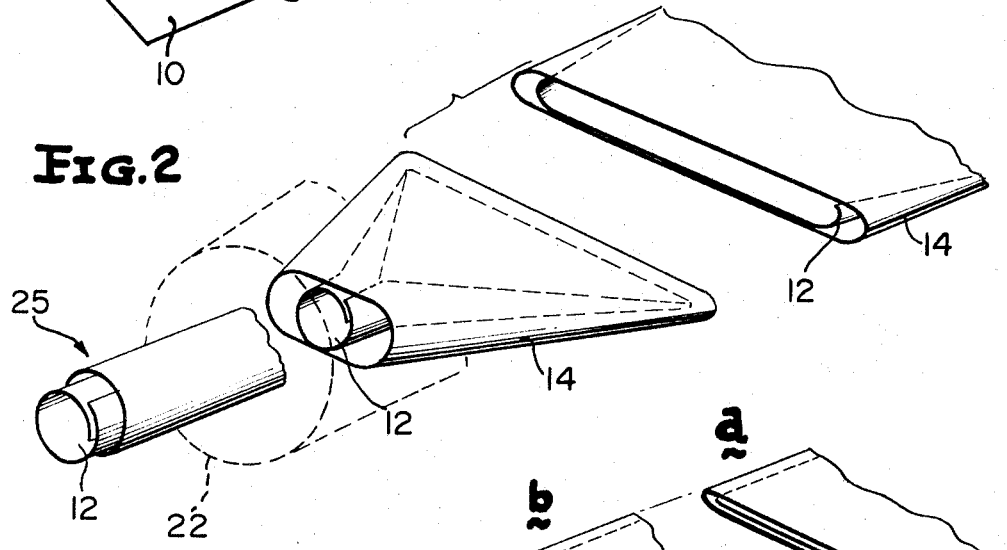
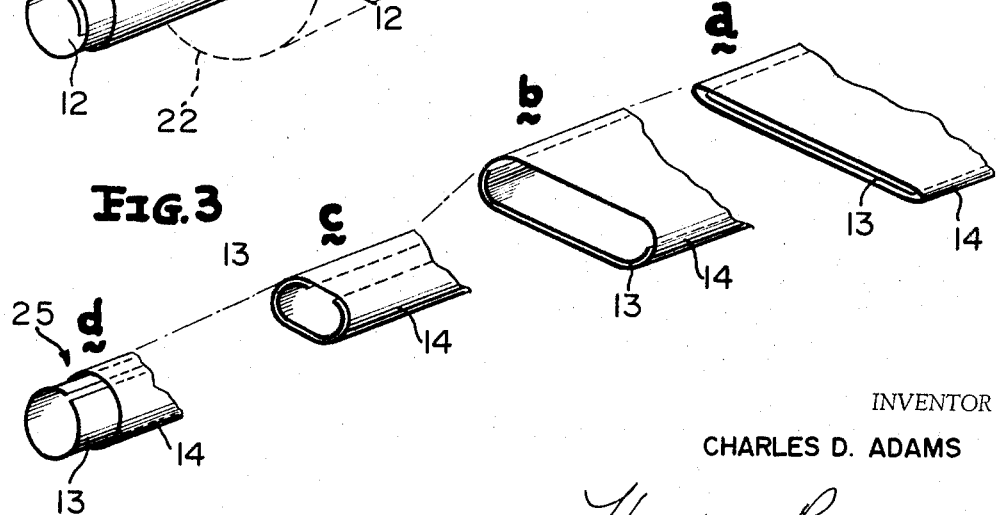
INVENTOR
CHARLES D. ADAMS
BY Hurvitz & Rose
ATTORNEYS June 11, 1968  C. D. ADAMS  3,387,414
EXTENDIBLE BOOM
Filed Oct. 23, 1965  2 Sheets-Sheet 2
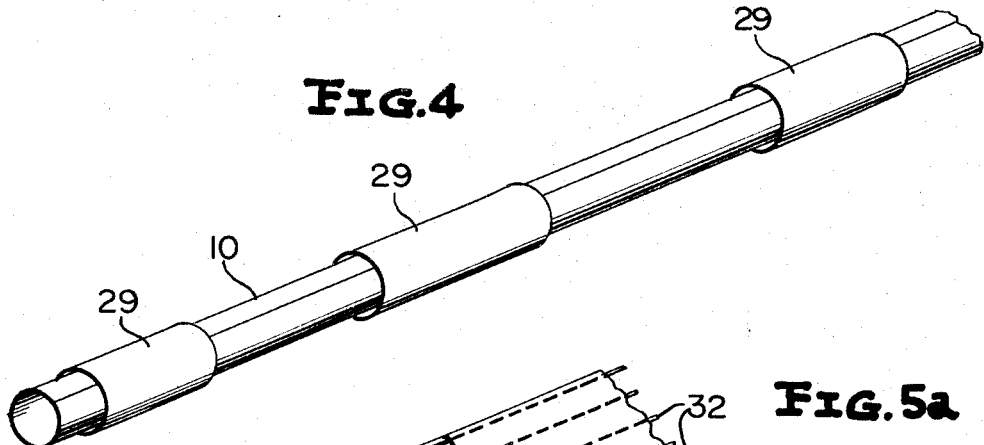
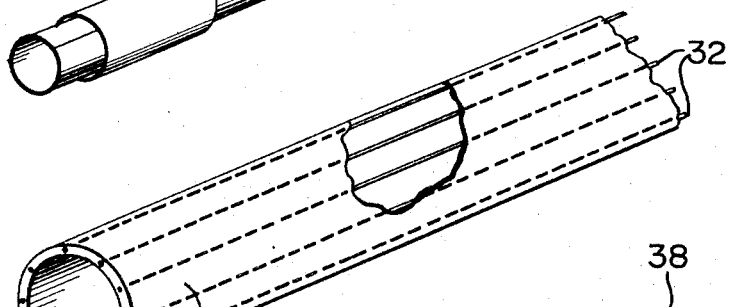
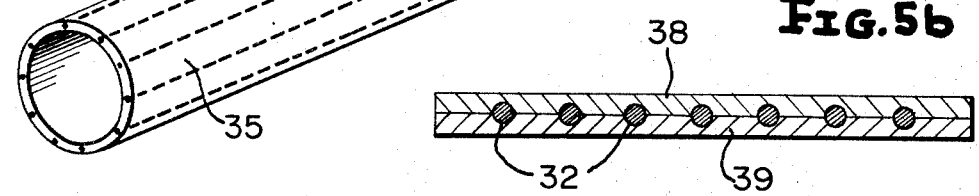
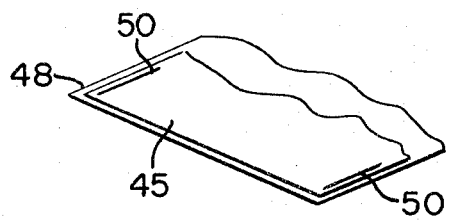
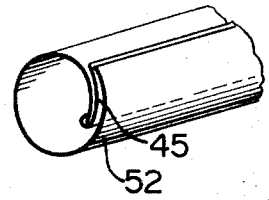
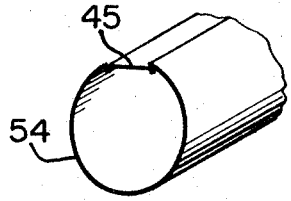
INVENTOR
CHARLES D. ADAMS
BY *Hurvitz & Rose*
ATTORNEYS

United States Patent Office 3,387,414
Patented June 11, 1968

3,387,414
EXTENDIBLE BOOM
Charles D. Adams, Annandale, Va., assignor to Melpar, Inc., Falls Church, Va., a corporation of Delaware
Filed Oct. 23, 1965, Ser. No. 503,802
14 Claims. (Cl. 52—108)

ABSTRACT OF THE DISCLOSURE

An extendible structurable boom member comprising a heat shrinkable material and a metal foil material wound as a strip coil on a storage drum. During deployment, the strip is unwound and heated causing the shrinkable material to curl the metal foil to the desired boom configuration. The shrinkable material is employed as either a sheath about the foil or as a tape secured to the foil.

---

The present invention relates generally to structural members and more particularly to members which may be stored in a flattened compact condition and which are extendible in tubular configuration to provide the strength and rigidity of continuous cross-section members.

Many situations presently exist in which it is desirable to provide booms, i.e. rigid extended tubular members, which may be stored in compact form and yet which may be readily and rapidly converted to elongated structural members possessing high torsional rigidity. A few typical practical applications for such members are as antennas for space vehicles, satellite appendages, and gravity gradient devices. In the past, storable booms have been provided in rigid sections which are subsequently assembled in lengths as desired for a particular application, or in folded configurations which are extendible to form the desired structure. The disadvantages of such arrangements for use in the situations exemplified above are obvious, e.g. high complexity, high weight, low speed of assembly, unwieldy structure, packaging problems, and so forth.

More recently, a truly extendible, more compactly stored structural member has been devised for use in the above-named applications, the member being essentially a flat strip of metal foil which has been fabricated in a pre-stressed condition so that unrestrained sections thereof assume a tubular shape of split circular cross-section. An example of such a device is that disclosed by Weir et al. in U.S. Patent No. 3,144,104. The foil is stored in a strained flattened condition by winding it on a drum contained in the deployment reel. As the flattened strip is extended from the drum, the absence of restraint on the extended portion permits it to re-assume its pre-stressed tubular shape. It has been found, however, that the resulting structure possesses very low torsional rigidity with the result that combined torsion and bending loads on the structure cause unusual and unpredictable deflection and buckling characteristics. In addition, certain problems have existed in the provision of a suitable deployment system for the member.

In the copending application of E. C. Trexler, Jr. entitled "Extendible-Retractible Boom," Ser. No. 517,589, filed Dec. 30, 1965, there is disclosed an improvement in extendible structures which overcomes many of the disadvantages in the structural characteristics and deployment system of extendible booms of the pre-stressed type. However, it is characteristic of all such pre-stressed booms that they require special, relatively expensive fabrication techniques; that these fabrication techniques necessarily limit the size, i.e. length and diameter, of the final boom; that the resulting boom can, at best, only approach the strength and rigidity of a continuous cross-section member, without attaining that desirable objective; that the boom is incapable of internal pressurization by which added rigidity may be achieved; and that emphasis is placed on extendibility and collapsibility of the member whereas only the former capability may be ultimately desired, as in the typical practical applications mentioned above.

It is accordingly a primary object of the present invention to overcome various disadvantages of prior art extendible booms wherein the desirable characteristics of a continuous cross-section are achieved for discontinuous configurations.

Another object of the present invention is to provide a lightweight, extendible, structural member which is capable of sustaining internal pressure to improve its rigidity.

Briefly, in accordance with the present invention a heat-shrinkable material is employed in combination with a flat metal foil material, the combination being wound in the form of a strip coil on a storage drum and installed in a conventional deployment mechanism. During deployment the unwound strip is heated, causing the shrinkable material to contact and exert a curling force on the metal foil, resulting in the desired boom configuration.

In one embodiment of the invention, the metal foil is inserted into a flat sheath fabricated from the heat-shrinkable material. In order to obtain the greatest rigidity in the final boom structure, the shrinkable sheath should cover the entire length of the foil, but in certain applications where only small orders of improvement are desired several short sections of the sheath may be spaced at specified intervals along the foil length.

The full length sheath may be extended slightly beyond the free end of the foil so that sufficient contraction is obtained at that point to permit continual internal pressurization of the extended boom, thereby providing improved bending rigidity. In other cases, added rigidity may be obtained by reinforcing the shrinkable material with longitudinal wires or filaments.

In other embodiments of the present invention, the shrinkable material is used as a flat sheet which is bonded, crimped, or otherwise suitably and securely fastened to the foil so that during the shrinking process the foil is curled into the desired shape. It will subsequently be noted that the present invention offers advantages over prior art structures even where pre-stressed foil is used with the heat shrinkable material.

The above and still further objects, features and attendant advantages of the present invention will become apparent from a consideration of the following detailed description of several embodiments thereof, especially when taken in conjunction with the accompanying drawings, in which:

FIGURE 1 is a perspective view of a shrinkable, full length sheath enclosing a foil strip in accordance with one embodiment of the present invention;

FIGURE 2 is a fragmentary perspective view of the embodiment of FIGURE 1 during deployment of the boom, wherein pre-stressed foil is used;

FIGURE 3 is a fragmentary perspective view of the extending boom in accordance with the embodiment of FIGURE 1, wherein unstressed foil is used;

FIGURE 4 is a perspective view of another embodiment of the boom, wherein sections of the sheath are spaced at predetermined intervals along the length of the foil;

FIGURES 5a and 5b are views of another embodiment of the boom wherein a reinforced sheath is employed;

FIGURE 6 is a perspective view of a further embodiment of the invention wherein a sheet of heat-shrinkable material is bonded to the foil strip; and FIGURES 7 and 8 are perspective views of booms formed using pre-stressed and non-pre-stressed foils, respectively, in embodiments of the type illustrated in FIGURE 6.

Referring now to FIGURE 1, strip, ribbon, or tape 10 is composed of a thin resilient metal foil which is adapted to yield elastically when subjected to forces at its edges creating a moment about its longitudinal axis, but to be resistive to transverse deformation in the presence of forces directed inwardly of its edges in the plane containing the strip. One of several materials possessing such desired characteristics is beryllium copper, preferably having been tempered at temperatures in excess of those to which the strip is to be subjected during boom deployment. The flat strip 10 is inserted into a sheath 14 of heat shrinkable material and this assembly wound in the form of a multi-layer coil 19 on a rotatable storage drum 16. Unreeling of the sheathed foil may be accomplished, for example, by rotating the storage drum via the shaft of a conventional motor.

Suitable heat shrinkable materials from which sheath 14 may be fabricated are, for example, vinylidene fluoride (which shrinks at approximately 175° F.), PVC (325° F.), Mylar (210° F.), silicone (300° F.). Each of these materials is readily fabricated as flexible tubing by well known techniques.

FIGURE 2 is a fragmentary perspective view of the assembly of FIGURE 1 wherein an existing pre-stressed foil strip 12 is encased in the sheath 14. As the encased foil is unreeled from the storage drum during deployment by conventional driving and guiding apparatus, strip 12 tends to curl as a result of the pre-stressing but is restrained from assuming a tubular shape by sheath 14. The foil-sheath assembly is guided through a heating unit or heat source 22 which is here illustrated as a conventional radiant heating coil. The heat source is preferably shaped to enclose an entire section of the foil-sheath assembly to insure even heat distribution at all points of the sheath within that section. In addition, heat source 22 may approximate the predetermined changing shape of the foil-sheath assembly as sheath 14 is subjected to temperatures appropriate to shrink the particular heat shrinkable material employed. Thus, for example, the heat source illustrated in FIGURE 2 has an oblong or oval shape at the point of entry of the foil-sheath assembly, and varies in a continuous fashion to a relatively cylindrical shape at the point of egress of the assembly. The heating coil may be operated from a suitable source of electricity, and may be thermostatically controlled in any conventional manner so that the temperature to which the sheath is subjected does not exceed a predetermined maximum limit for the particular heat shrinkable material used. Heat source 22 may further be enclosed in a housing (not shown) having a reflective interior surface and an insulative exterior surface to prevent excessive heating of parts adjacent thereto. It will be understood that the heat source may be of any convenient radiant or convective type, and that the foil-sheath assembly is moved uniformly relative to the fixed position of the heat source.

As the foil-sheath assembly is heated, sheath 14 will begin to shrink, permitting foil strip 12 to assume its pre-stressed unrestrained tubular shape. During passage through heating unit 22 the sheath will shrink relatively tightly about the tubular foil, and upon egress the foil-sheath assembly has the form of a rigid boom 25. Boom 25 overcomes the undesirable structural characteristics of prior art extendible booms, by provision of the continuous cross-section of its sheath. Specifically booms according to the present invention avoid the torsional instability of prior art booms of discontinuous cross-section, that instability being attributable largely to inherent torque (prestressing) and faulty seam structure (if any), and evidenced by longitudinal deformation, undesirable shear flow and angle of twist. The present boom structure is rendered torsionally stable and rigid by enclosing the split cross-section foil in a continuous cross-section sheath. It is to be noted that the necessity of special foil strip edge structure to obtain an interlocking seam or joint is eliminated by the present invention.

Referring now to FIGURE 3, there is shown a foil-sheath assembly in which foil strip 13 is of non-pre-stressed (i.e. unstressed) configuration. Part a of FIGURE 3 illustrates the assembly as it is unreeled from the storage drum for deployment. In part b of the figure, the assembly has been subjected to its initial heating, by means corresponding to that of FIGURE 2, and sheath 14 has begun to shrink, thereby exerting a curling force about each longitudinal edge of strip 13. Continued heating results in the foil-sheath assembly shape shown in part c of FIGURE 3, and finally in the rigid boom structure of part d. It is not critical that the deployed boom have a cylindrical shape, i.e., some deviation from a strictly circular cross-section is permissible, although the cylindrical shape is preferable for increasing resistance to bending, i.e., to provide greater rigidity, in every plane containing the longitudinal axis of symmetry of the boom.

In some applications, only small orders of improvement over prior art boom structures may be sufficient and, in those cases, the sheath need not enclose the full length of the extended boom. Such an embodiment is shown in FIGURE 4 where heat shrinkable tubing sections 29 have been initially spaced at regular longitudinal intervals along foil strip 10, and the foil-sheath assembly thereafter converted to a boom structure as in the previously discussed manner. In this case it is necessary that the strip 10 be prestressed in the usual fashion to prevent incomplete formation of a uniform cross-section at any of the unsheathed strip sections during boom deployment.

Referring now to FIGURE 5a, increased longitudinal rigidity may be provided in the final boom structure by use of reinforcing wires or filaments 32 spaced at substantially uniform circumferential intervals in the heat shrinkable sheath 35. In this embodiment, the reinforcing wires 32 are disposed longitudinally along a lamina 39 of the heat shrinkable material, and spaced approximately at equal intervals laterally of the strip (FIGURE 5b). A matching lamina 38 of heat shrinkable material is placed upon the surface of lamina 39 on which the reinforcing filaments are disposed so that the latter are sandwiched between the two laminae. The resulting configuration may be laminated and then sealed in the form of a tube or sheath in any conventional manner, for subsequent insertion of an unstressed or a prestressed strip as in the previously described embodiments.

Referring now to FIGURE 6, a still further embodiment of the present invention is provided by bonding or otherwise suitably fastening a flat sheet 45 of the shrinkable material to an unstressed or prestressed foil 48 at specific points, e.g., 50, adjacent the longitudinal edges of the foil. As sheet 45 is subjected to heat, as in the previously described manner, the material of which it is composed will shrink and thus pull the edges of the foil or strip 48, curling it into the desired tubular shape. Where the foil has been prestressed, as in FIGURE 7, the shrunken strip 45 will act against the internal elastic energy of the foil to maintain the resulting boom at a specified diameter. In cases where an unstressed foil is employed, as in FIGURE 8, shrinking of sheet 45 results in a tubular configuration comprising the curled foil 54 having a connecting joint or seam formed by the shrunken sheet. Extension of the boom is, of course, carried out in the manner exemplified above. Here, too, the heat shrinkable sheet or tape may be reinforced with filaments as shown in FIGURE 5b.

It will be recognized that the above and still further embodiments of the present invention may be provided by

I claim:

1. In combination, a strip of metal foil, said strip being storable in the form of a coil of successive strip layers, a sheath of flexible heat shrinkable material transversely enclosing said strip along at least a portion of its length and coilable therewith, means for uncoiling the sheathed foil, and means for heating said sheath to cause shrinkage thereof, the physical parameters of said strip and sheath being arranged and adapted to produce curling of said strip about its longitudinal axis so that a substantially tubular rigid member is formed as the sheath foil is uncoiled and subjected to heating, said sheath extending over a sufficient length of said strip to assure curling of the entire uncoiled portion of the strip.

2. The combination according to claim 1 wherein said strip of metal is composed of a resilient material prestressed to tend to curl about its longitudinal axis in the absence of any restraining forces.

3. The combination according to claim 1 wherein said sheath comprises a plurality of rings of heat shrinkable material spaced at longitudinal intervals along said strip.

4. The combination according to claim 1 wherein said sheath includes a plurality of laminae of heat shrinkable material, and a plurality of spaced longitudinally extending reinforcing filaments interposed between said laminae.

5. In combination, a strip of metal foil, said strip being stored in the form of a coil of successive strip layers, a heat shrinkable tape secured along its edges to preselected points adjacent the longitudinal edges of said strip, said tape being coiled with said strip to form adjacent layers of strip and tape, means for heating said tape to cause shrinkage thereof while uncoiling the secured combination of strip and tape for subjection of the tape to said heating, the physical parameters of said tape and sheath being selected to produce sufficient curling of said strip about its longitudinal axis that a substantially tubular rigid member is formed having a seam comprising the shrunken tape.

6. The combination according to claim 5 wherein said strip of metal foil is composed of a resilient material prestressed to assume a tubular shape in the absence of restraining forces, so that the tape seam acts as a confining force against the internal elastic energy in said strip, to maintain said tubular member at a predetermined diameter.

7. The combination according to claim 5 wherein said tape includes a plurality of heat shrinkable laminae, and a plurality of spaced reinforcing filaments longitudinally interposed between said laminae.

8. A structural boom member comprising an elongated relatively narrow strip of resilient metal foil, said strip being coiled in a roll of continuous successive layers, flexible heat shrinkable material transversely enclosing said strip and coiled therewith, means for uncoiling said strip and said shrinkable material into a linear member and heating said shrinkable material while it is being uncoiled, the physical parameters of said material and strip being selected to curl said strip about its longitudinal axis into a rigid substantially tubular member as heating occurs and as the shrinkable material shrinks about said tubular member.

9. An extendible structural boom member comprising an elongated resilient relatively narrow thin strip of metallic foil, said strip being arranged in continuous successive layers, a sleeve of flexible, heat shrinkable material longitudinally enclosing at least a portion of the length of said strip, the width and resilience of said strip and the transverse dimensions of said sleeve and the shrinkability of said sleeve being selected to provide a rigid, substantially tubular member on linearizing said strip and sleeve and concurrently heating the strip and sleeve.

10. In combination, an elongated narrow strip of resilient metal foil, the strip being formed in continuous successive layers, a flexible, heat shrinkable material longitudinally enclosing at least a portion of the length of said strip, means for linearizing and concurrently heating said strip and shrinkable material, the resilience and width of said strip and the transverse dimensions and shrinkability of said tube heat shrinkable material being selected to enforce curling of said strip about a longitudinal axis into a rigid substantially tubular member as the shrinkable material shrinks about said strip in response to said heat.

11. A strip coil of successive strip layers extendible to form, when subjected to heating at predetermined temperatures, a rigid tubular member of continuous cross-section, said coil comprising a ribbon of resilient metal foil, said ribbon being prestressed to assume a tubular shape in the absence of restraining forces, and heat shrinkable means extending along at least a portion of the length of said ribbon for confining said cross-section to substantially uniform dimensions throughout the length of said formed tubular member.

12. A strip coil of successive strip layers extendible to form, when subjected to heating at predetermined temperatures, a rigid tubular member of continuous cross-section, said coil comprising a ribbon of resilient metal foil, and heat shrinkable means co-extensive with said ribbon for confining said cross-section to substantially uniform dimensions throughout the length of said formed tubular member, wherein said heat shrinkable means comprises a sheath longitudinally enclosing said ribbon.

13. A strip coil of successive strip layers extendible to form, when subjected to heating at predetermined temperatures, a rigid tubular member of continuous cross-section, said coil comprising a ribbon of resilient metal foil, and heat shrinkable means for confining said cross-section to substantially uniform dimensions throughout the length of said formed tubular member, said heat shrinkable means comprising a plurality of rings of heat shrinkable material spaced at longitudinal intervals about said ribbon.

14. A strip coil of successive strip layers extendible to form, when subjected to heating at predetermined temperatures, a rigid tubular member of continuous cross-section, said coil comprising a ribbon of resilient metal foil, and heat shrinkable means extending along at least a portion of the length of said ribbon for confining said cross-section to substantially uniform dimensions throughout the length of said formed tubular member, wherein said heat shrinkable means comprises a plurality of laminae, and a plurality of spaced longitudinally extending reinforcing filaments interposed between said laminae.

References Cited

UNITED STATES PATENTS

| | | | |
|---|---|---|---|
| 2,352,526 | 6/1944 | Ferrand | 52—108 |
| 3,017,729 | 1/1962 | Cheeley. | |
| 3,144,104 | 8/1964 | Weir et al. | 52—108 |
| 3,144,215 | 8/1964 | Klein | 52—108 X |
| 2,980,245 | 4/1961 | Stoker. | |
| 3,177,987 | 4/1965 | Swain | 52—108 |

FOREIGN PATENTS

| | | |
|---|---|---|
| 619,904 | 8/1964 | Canada. |

HENRY C. SUTHERLAND, *Primary Examiner.*